US009996085B2

(12) United States Patent
Chung et al.

(10) Patent No.: US 9,996,085 B2
(45) Date of Patent: Jun. 12, 2018

(54) AUTOMATIC GUIDING SYSTEM FOR ANALYZING PAVEMENT CURVATURE AND METHOD FOR THE SAME

(71) Applicant: HON HAI PRECISION INDUSTRY CO., LTD., New Taipei (TW)

(72) Inventors: I-Hao Chung, New Taipei (TW);
Tien-Ping Liu, New Taipei (TW);
Shu-Fen Chen, New Taipei (TW);
Yu-Chien Hsiao, New Taipei (TW);
Yu-Tai Hung, New Taipei (TW);
Fu-Hsiung Yang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 26 days.

(21) Appl. No.: 15/191,946

(22) Filed: Jun. 24, 2016

(65) Prior Publication Data

US 2017/0212522 A1    Jul. 27, 2017

(30) Foreign Application Priority Data

Jan. 26, 2016    (TW) .............................. 105102399 A

(51) Int. Cl.
| G05D 1/00 | (2006.01) |
| G05D 1/02 | (2006.01) |
| G01B 11/24 | (2006.01) |
| G01B 11/22 | (2006.01) |
| G01B 11/00 | (2006.01) |

(52) U.S. Cl.
CPC ......... *G05D 1/0246* (2013.01); *G05D 1/0088* (2013.01)

(58) Field of Classification Search
None
See application file for complete search history.

(56) References Cited

U.S. PATENT DOCUMENTS

| 5,904,725 | A * | 5/1999 | Iisaka ................ G01S 5/16 |
| | | | 348/116 |
| 5,922,036 | A * | 7/1999 | Yasui ................. G01C 21/26 |
| | | | 342/436 |
| 6,091,833 | A * | 7/2000 | Yasui ................. G05D 1/0246 |
| | | | 348/118 |
| 2009/0097038 | A1* | 4/2009 | Higgins-Luthman |
| | | | .................. B60G 17/019 |
| | | | 356/602 |
| 2013/0080019 | A1* | 3/2013 | Isaji .................. B60W 30/16 |
| | | | 701/96 |
| 2016/0271795 | A1* | 9/2016 | Vicenti ............... B25J 9/163 |

* cited by examiner

*Primary Examiner* — Rami Khatib
(74) *Attorney, Agent, or Firm* — ScienBiziP, P.C.

(57) ABSTRACT

An automatic guiding system for analyzing pavement curvature in or on an autonomous mobile device comprises an image acquisition module, a pavement curvature analysis module, a posture sensing module, and a pavement curvature database. The image acquisition module collects pavement curvature images as the autonomous mobile device moves. The pavement curvature analysis module processes the pavement curvature images, and extracts contour information of the pavement curvature images. The posture sensing module continuously senses the posture of the autonomous mobile device. The pavement curvature database is configured to stores the contour information and the posture.

11 Claims, 2 Drawing Sheets

AUTOMATIC GUIDING SYSTEM FOR ANALYZING PAVEMENT CURVATURE AND METHOD FOR THE SAME

CROSS-REFERENCE TO RELATED APPLICATIONS

This application claims all benefits accruing under 35 U.S.C. § 119 from China Patent Application No. 201610050402.1, filed on Jan. 26, 2016 in the China Intellectual Property Office, and TW Patent Application No. 105102399, filed on Jan. 26, 2016 in the TW Intellectual Property Office, the contents of which are hereby incorporated by reference.

FIELD

The subject matter herein generally relates to an automatic guiding system for analyzing pavement curvature and a method for the same.

BACKGROUND

Simultaneous localization and mapping (SLAM) is commonly used in autonomous mobile devices for positioning. SLAM means the autonomous mobile devices start from an unknown environment location, and establish their own location and posture by repeatedly observing map features during a movement; then incrementally constructing a map, so as to achieve a self-locating and map-constructing simultaneously.

However, if a pavement curvature is great, a displacement or deviation of the autonomous mobile devices can occur. The displacement or deviation of the autonomous mobile devices will affect future direction and distance of the autonomous mobile devices, and even cause the autonomous mobile devices to be dumped or destroyed.

BRIEF DESCRIPTION OF THE DRAWING

Implementations of the present technology will now be described, by way of example only, with reference to the attached figures, wherein.

DETAILED DESCRIPTION

Figure 1:
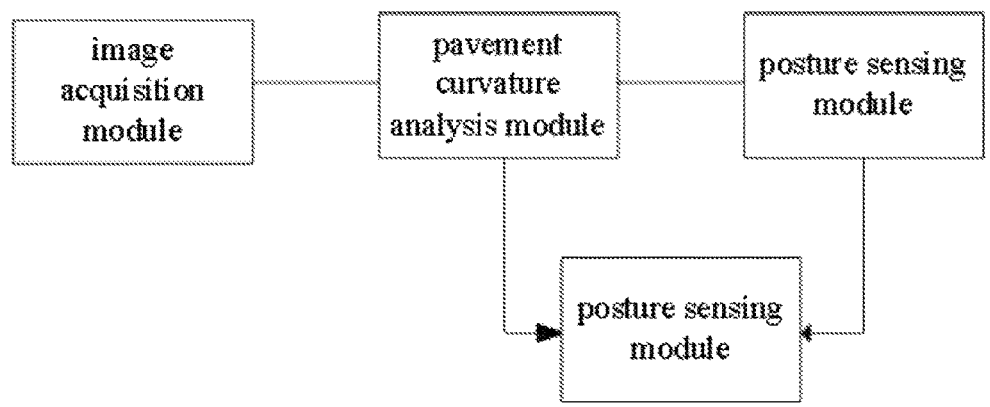
FIG. 1 is a schematic view of a module of an automatic guiding system for analyzing pavement curvature according to one embodiment.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature described, such that the component need not be exactly conforming to such feature. The term "comprise," when utilized, means "include, but not necessarily limited to"; it specifically indicates open-ended inclusion or membership in the so-described combination, group, series, and the like.

Referring to FIG. 1, the present disclosure is described in relation to an automatic guiding system for analyzing pavement curvature. The automatic guiding system for analyzing pavement curvature comprises an image acquisition module, a pavement curvature analysis module, a posture sensing module, and a pavement curvature database. The image acquisition module is used to collect pavement curvature images in a direction of movement of an autonomous mobile device. The pavement curvature analysis module is connected with the image acquisition module. The pavement curvature analysis module is used for receiving and processing the pavement curvature images and extracting contour information from the pavement curvature images. The posture sensing module senses the posture of the autonomous mobile device as the autonomous mobile device moves. The pavement curvature database is used to store the contour information and the posture.

The autonomous mobile device can be any mobile device, such as robot or unmanned vehicle.

The image acquisition module comprises a camera. The camera is located on a side of the autonomous mobile device facing the direction of movement. The camera is used to shoot the pavement curvature images. The pavement curvature can be a straight pavement, a winding pavement, or an upward or downward-sloping pavement. The camera can be a web camera based on Charge-coupled Device (CCD) or Complementary Metal Oxide Semiconductor (CMOS) camera.

The pavement curvature analysis module and the image acquisition module are connected together. Signals of the pavement curvature images acquired by the image acquisition module are transmitted to the pavement curvature analysis module. The pavement curvature analysis module processes the pavement curvature image based on a computer vision technology, in order to extract the contour information. For the upward or downward-sloping pavements, the contour information can be described as feature information that can clearly distinguish the pavement curvature, such as "pavement rises" or "pavement slopes down." For the winding pavements, a degree of bend or angle of the pavement can be calculated according to the contour information extracted by the pavement curvature analysis module, and the contour information can be described as "turns left 70 degrees", "turns right 30 degrees", etc.

The posture sensing module comprises an inertial measurement unit (IMU). The IMU comprises a gyro. An azimuth of the autonomous mobile device can be obtained by the gyro; changes in the azimuth during movement can be obtained by a mathematical prediction model; and combining the contour information extracted by the pavement curvature analysis module; the posture of the autonomous mobile device can be predicted. The mathematical prediction model can be Kalman filtering.

The pavement curvature database stores the contour information of the pavement curvature images and the posture corresponding to the contour information of each pavement curvature image. Such as the contour information "turn left 70 degrees" corresponding to the posture "acceleration to 30 km/h", the contour information "turn left 30 degrees" corresponding to the posture "acceleration to 50 km/h". The pavement curvature database classified stores the contour information of the pavement curvature images, and the contour information can be presented in a text form. Developing and refining the contour information continuously, and corrections to the posture corresponding to the contour information can be continuously applied, in order to maintain safety of the autonomous mobile device.

The contour information of the pavement curvature image corresponds to the posture of the autonomous mobile device. The postures stored in the pavement curvature database can not be repeated to prevent confusion.

The automatic guiding system for analyzing pavement curvature further comprises a positioning module, such as a global positioning system (GPS) device. The positioning module is used to obtain a geographical location of the autonomous mobile device on the pavement. The positioning module in combination with the pavement curvature database inputs the postures of the autonomous mobile device in different environments at different times into a cloud storage system. Data as to one road section under different environments can be analyzed for obtaining an ideal posture of that road section, and the ideal posture is stored in the pavement curvature database. Other autonomous mobile devices can pass through the road section smoothly and safety just by downloading the pavement curvature database. Different environments may comprise a pavement covered with snow or ice.

The automatic guiding system for analyzing pavement curvature further comprises a data validation module. The data validation module is connected with the pavement curvature analysis module and the pavement curvature database. The data validation module is used to determine if the contour information extracted by the pavement curvature analysis module matches the contour information stored in the pavement curvature database. In this context, "matches" means that the contour information extracted by the pavement curvature analysis module is substantially the same as that stored in the pavement curvature database.

Figure 2:
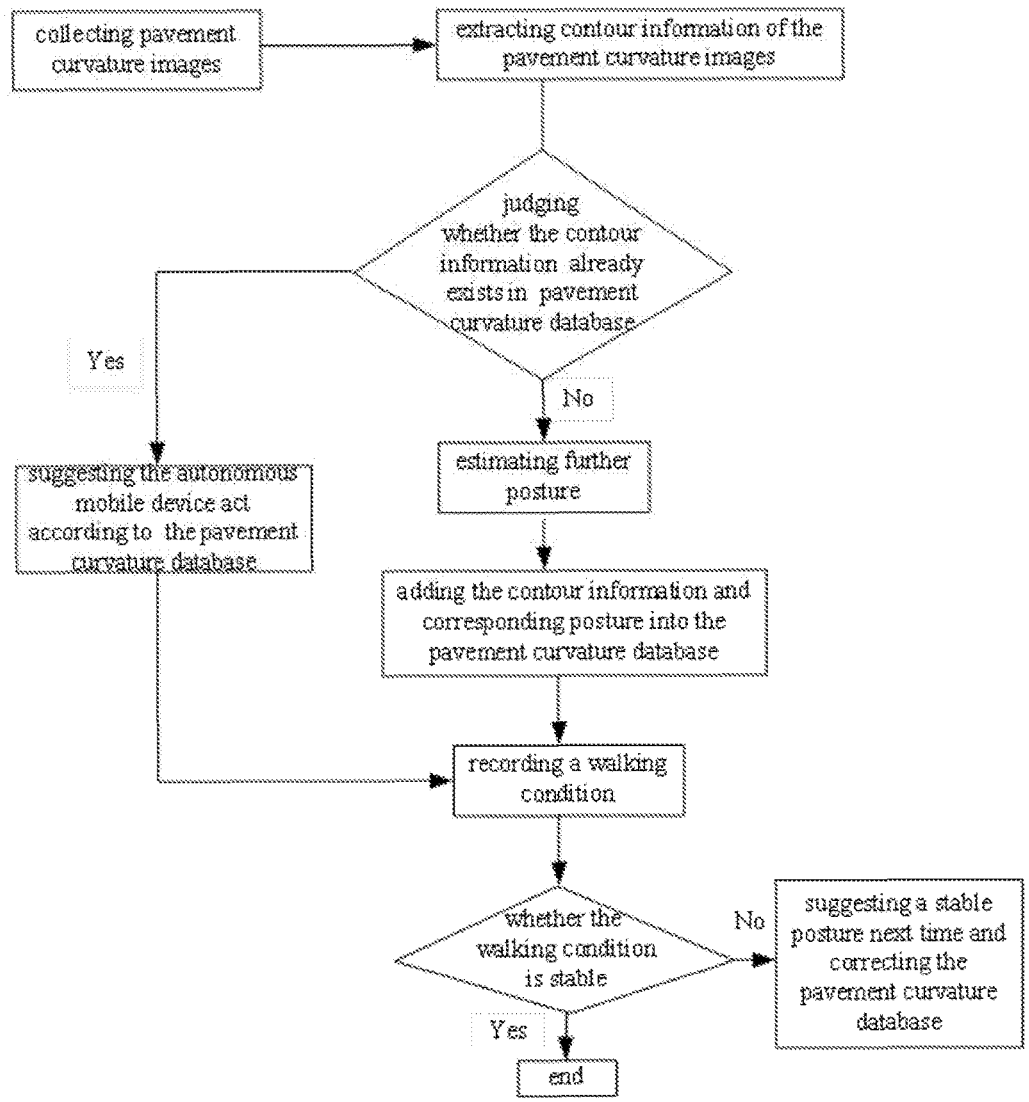
FIG. 2 is a flow chart of an automatic guiding system for analyzing pavement curvature according to one embodiment.

FIG. 2 illustrates one embodiment of a method for the automatic guiding system for analyzing pavement curvature comprising the following steps:

S1: providing an autonomous mobile device having the automatic guiding system for analyzing pavement curvature;

S2: collecting the pavement curvature images of the autonomous mobile device in the direction of movement by the image acquisition module, and transmitting the pavement curvature images to the pavement curvature analysis module;

S3: processing the pavement curvature images by the pavement curvature analysis module, and extracting the contour information of the pavement curvature images;

S4: sensing the posture by the posture sensing module combined with the contour information, while the autonomous mobile device is on the pavement having the contour information;

S5: comparing the contour information of the pavement curvature images and the contour information stored in the pavement curvature database, judging whether the contour information of the pavement curvature images already exists in the pavement curvature database; if "yes", finding out the contour information in the pavement curvature database, and suggesting the autonomous mobile device act accordingly based on the posture corresponding to the contour information in the pavement curvature database; if "no", adding the contour information of the pavement curvature image and corresponding posture into the pavement curvature database; and S6: recording a walking condition of the autonomous mobile device.

In step S3, a method of processing the pavement curvature images by the pavement curvature analysis module can comprise the following steps:

S31: extracting the pavement curvature contour images of the pavement curvature images;

S32: dividing a gait cycle, unifying a size of the pavement curvature contour images, and extracting the characteristic factors of the pavement curvature contour images; and S33: obtaining a gait energy image and its characteristic factor of each gait cycle, and obtaining the contour information of the pavement curvature images by multiplying a gray histogram and the characteristic factor of the gait energy image.

In step S4, the posture means acceleration, elevation, speed and other information of the autonomous mobile device, while the autonomous mobile device is on the pavement.

In step S6, the autonomous mobile device walks according to the posture of the pavement curvature database. Reading an output data of the gyro at intervals during walking, and analyzing the output data, such as creating a chart. If the output data of the gyro is less than a preset threshold value, a walking condition is "stable". If the output data of the gyro is larger than the preset threshold value, a walking condition is "unstable". When the output data of the gyro is larger than the preset threshold value, feeding the walking condition and the output data of the gyro back to the autonomous mobile device, and suggesting a relatively stable posture when the autonomous mobile device walks on the same pavement next time. The "unstable" comprises the autonomous mobile device shaking or dumping. The preset threshold value is a data by artificially setting. The data is a threshold of the posture of stable walking and the posture of unstable walking.

If the autonomous mobile device walks with an instable posture on one pavement, when the autonomous mobile device walks on that pavement next time, the autonomous mobile device will be suggested to walk with a relatively stable posture based on the instable posture and the output data of the gyro. And replacing the instable posture in the pavement curvature database with the relatively stable posture to gradually optimize the pavement curvature database.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. An automatic guiding system for analyzing pavement curvature comprising:
    an image acquisition module configured to collect pavement curvature images in a direction of movement of an autonomous mobile device;
    a pavement curvature analysis module connected with the image acquisition module, wherein the pavement curvature analysis module is configured to extract pavement curvature contour images from the pavement curvature images; divide a gait cycle, unify a size of the pavement curvature contour images, and extract a plurality of first characteristic factors from the pavement curvature contour images; solve a gait energy image and a second characteristic factor of the gait energy image for each gait cycle based on the plurality of first characteristic factors; and multiply a gray histogram and the second characteristic factor to obtain contour information of pavement curvatures;
    a posture sensing module configured to sense a posture of the autonomous mobile device; and
    a pavement curvature database configured to store the contour information and the posture.

2. The system of claim 1, wherein the pavement curvature is selected from a group consisting of a straight pavement, a winding pavement, an upward-sloping pavement and downward-sloping pavement.

3. The system of claim 1, wherein the pavement curvature database classifies the contour information.

4. The system of claim 3, wherein the contour information is presented in a text form.

5. The system of claim 1, wherein the image acquisition module comprises a camera located on a side of the autonomous mobile device that faces to the direction of movement.

6. The system of claim 1, further comprising a positioning module.

7. The system of claim 6, wherein the positioning module comprises a global positioning system.

8. The system of claim 1, further comprising a data validation module connected with the pavement curvature analysis module and the pavement curvature database.

9. A guiding method for an automatic guiding system comprising:
    S1: providing an autonomous mobile device having the automatic guiding system;
    S2: collecting pavement curvature images of the autonomous mobile device in a direction of movement by an image acquisition module, and transmitting the pavement curvature images to a pavement curvature analysis module;
    S3: processing the pavement curvature images by the pavement curvature analysis module by steps of:
        S31: extracting pavement curvature contour images of the pavement curvature images;
        S32: dividing a gait cycle, unifying a size of the pavement curvature contour images, and extracting a plurality of first characteristic factors of the pavement curvature contour images; and
        S33: obtaining a gait energy image and a second characteristic factor of the gait energy image for each gait cycle, and obtaining a first contour information of the pavement curvature images by multiplying a gray histogram and the characteristic factor of the gait energy image;
    S4: sensing a posture by a posture sensing module;
    S5: comparing the first contour information of the pavement curvature images and a second contour information stored in a pavement curvature database, when the first contour information of the pavement curvature images is substantially the same as the second contour information stored in the pavement curvature database, finding out the second contour information in the pavement curvature database, and suggesting the autonomous mobile device act accordingly based on a posture corresponding to the second contour information in the pavement curvature database; when the first contour information of the pavement curvature images is not substantially the same as the second contour information stored in the pavement curvature database, adding the first contour information of the pavement curvature images and corresponding posture into the pavement curvature database; and
    S6: recording a walking condition of the autonomous mobile device.

10. The guiding method of claim 9, wherein the step of recording the walking condition of the autonomous mobile device comprises: the autonomous mobile device walks according to the posture of the pavement curvature database; reading an output data of a gyro of the posture sensing module at intervals during movement, and analyzing the output data; when the output data of the gyro is less than a preset threshold value, the walking condition is "stable", when the output data of the gyro is larger than the preset threshold value, the walking condition is "unstable".

11. The guiding method of claim 10, wherein when the walking condition is "unstable", feeding the walking condition and the output data of the gyro back to the autonomous mobile device, and suggesting a stable posture when the autonomous mobile device walks on a same pavement next time; and storing the stable posture in the pavement curvature database.

* * * * *